M. GREEN.
Combined Cultivators and Seeders.
No. 158,062.  Patented Dec. 22, 1874.
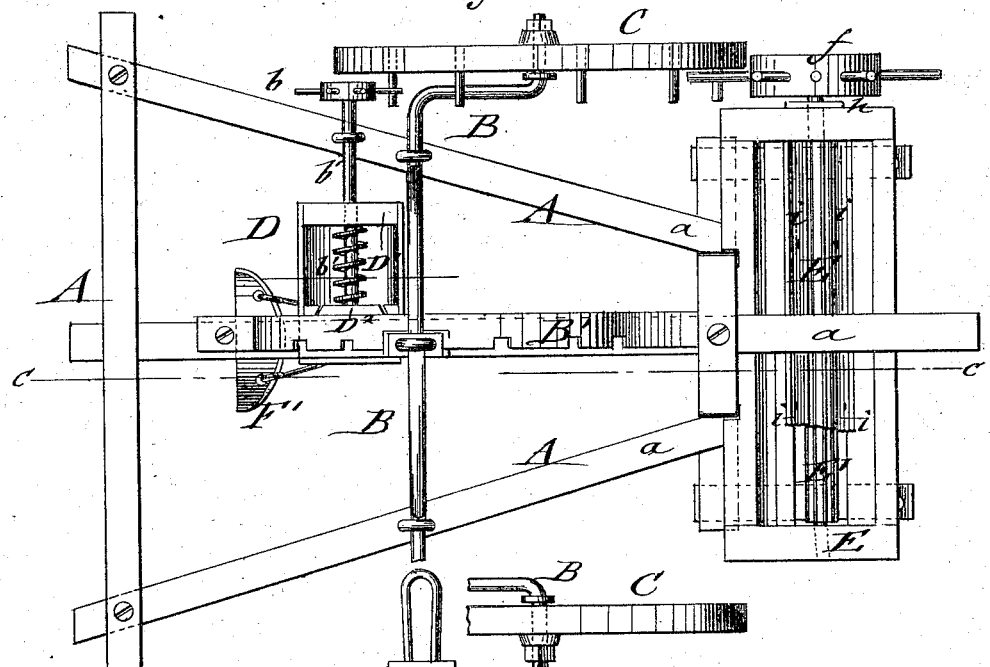
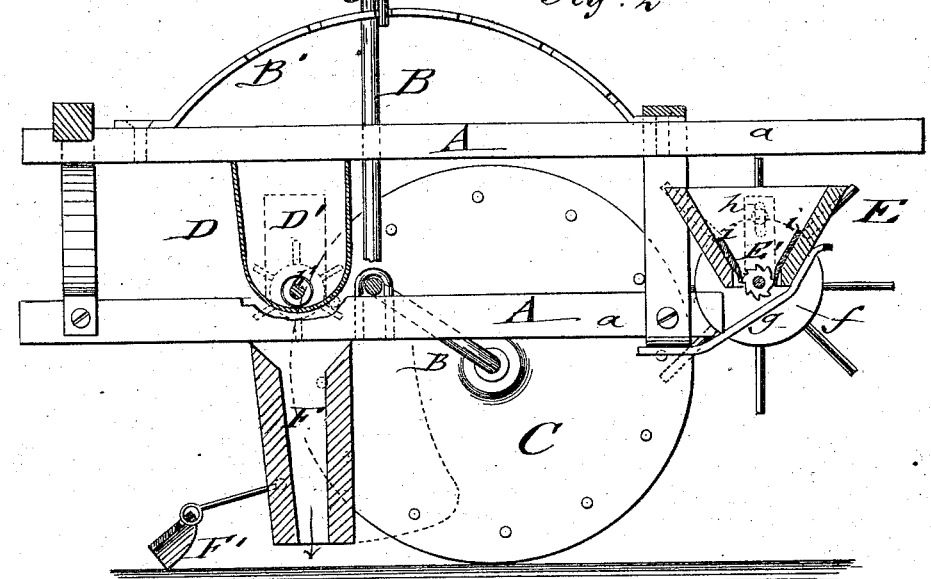
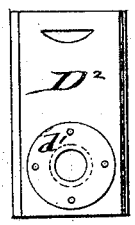
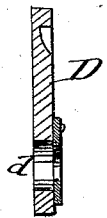
WITNESSES:
INVENTOR:
M. Green
BY
ATTORNEYS.

UNITED STATES PATENT OFFICE.

MATTHEW GREEN, OF WALKER STATION, MISSOURI.

IMPROVEMENT IN COMBINED CULTIVATORS AND SEEDERS.

Specification forming part of Letters Patent No. 158,062, dated December 22, 1874; application filed May 29, 1874.

*To all whom it may concern:*

Be it known that I, MATTHEW GREEN, of Walker Station, in the county of Vernon and State of Missouri, have invented a new and Improved Combined Cultivator and Seeder, of which the following is a specification:

In the accompanying drawing, Figure 1 represents a top view of my improved cultivator; Fig. 2, a side elevation, partly in section, on the line $c\,c$, Fig. 1. Fig. 3 are detail front and side views of the slide-piece for regulating dropping of seed.

Similar letters of reference indicate corresponding parts.

The invention will first be fully described, and then pointed out in the claim.

In the drawing, A represents the main supporting-frame of the cultivator, constructed of sides and central beams $a$, and arched axle B, which is adjustable on notched rack B' on top of the frame, so as to allow the raising and lowering of the plows, and the throwing in and out of gear of the seed-dropping devices. The cultivator-wheels C are applied to the ends of the curved axle, and gear with the seed-dropping mechanism D for planting in rows, and with the lateral seed-box attachment E for spreading smaller seed over the whole field.

The pinion $b$ of seed-dropping device D is, by any suitable mechanism, thrown in and out of gear with wheel C, and applied to a shaft, $b'$, which passes into the seed-receptacle D¹, along the bottom thereof, and is provided with a screw-thread inside of the box or receptacle.

A slide, D², has a perforation, $d$, with a flexible leather or rubber spring, $d'$, surrounding the same, being of a diameter corresponding to that of screw end of the shaft $b'$, so that the latter feeds by the rotation imparted by the gear-wheel C, the seed taken up by the spiral flange of the screw to the seed-conveying tube F carrying always an even and regular supply of cotton, corn, or other seed to be planted in rows, through the flexible guard-piece of the slide.

The ground is turned to a ridge by the suitable attachment of the plows, and a furrow produced therein by a shovel-plow attached in front of seed-guide tube, which deposits the seed in the center of the ridge, to be covered slightly by the curved scraper F' hung to the rear of the guide-tube, and still more so by a covering-roller attachment.

By using different sizes of screws and slide-pieces large or smaller quantities, and almost all kinds, of seeds may be planted.

A greater or less number of gear-pins or teeth in the cultivator-wheels produces either a regular drilling or the intermitted dropping in hills at each forward feeding of the screw. The screw works with great regularity, and is not liable to clog and interrupt thereby the working of the apparatus.

The lateral seed-box attachment E is supported detachably on brackets $g$ on the front part of frame A, and intended to be used for drilling smaller seed, as grain oats, &c., and to cover it with plows attached in suitable manner to the frame or with a harrow attachment.

A long fluted shaft, E', turns in adjustable bearings $h$ at both ends of the box, and feeds the seed regularly, in connection with the flexible side strips $i$ of leather, rubber, or similar material, which bind on the shaft, and allow only the required quantity to pass. The shaft receives its motion from a gear-wheel, $f$, intermeshing with the cultivator-wheel.

The quantity of seed to be drilled is regulated by the bearings, bringing the shaft into higher or lower position in the opening of the box, so as to carry a smaller or larger quantity of seed through the flexible strips.

By carrying the arched axle B into forward position, and securing it on rack B', the plows are raised and the seeding attachments thrown out of gear.

The cultivator may, by the use of separate seed-dropping devices for large and small seed, be employed for a greater variety of farming operations, so that its usefulness is increased.

Having thus described my invention, I claim as new and desire to secure by Letters Patent—

The combination, with seed-receptacle D¹, of shaft $b'$, having spiral flange, and perforated slide D², having flexible ring D $d'$, as and for the purpose specified.

MATTHEW GREEN.

Witnesses:
 BENJAMIN SNODGRASS,
 ORRIS HARDING.